United States Patent
Purcell et al.

(10) Patent No.: US 10,896,097 B1
(45) Date of Patent: Jan. 19, 2021

(54) APPROACHES FOR BACKUP AND RESTORATION OF INTEGRATED DATABASES

(71) Applicant: Palantir Technologies Inc., Palo Alto, CA (US)

(72) Inventors: Kolin Purcell, San Francisco, CA (US); Alexander Neronskiy, Palo Alto, CA (US); Hamza Muraj, Austin, TX (US); Jourdan Miller, Washington, DC (US); Liam Elberty, Redwood City, CA (US); Matthew Betten, Palo Alto, CA (US); Matthew Jenny, San Francisco, CA (US); Michael Ryan, Rockville Centre, NY (US); Nathan Bruner, Palo Alto, CA (US); Shanthanu Bhardwaj, Mountain View, CA (US); Spencer Stecko, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 247 days.

(21) Appl. No.: 15/605,583

(22) Filed: May 25, 2017

(51) Int. Cl.
*G06F 11/14* (2006.01)
*G06F 16/22* (2019.01)
*G06F 16/23* (2019.01)

(52) U.S. Cl.
CPC ...... *G06F 11/1451* (2013.01); *G06F 16/2255* (2019.01); *G06F 16/2379* (2019.01);
(Continued)

(58) Field of Classification Search
CPC ............. G06F 11/1451; G06F 16/2379; G06F 16/2255; G06F 2201/805; G06F 2201/80; G06F 2201/82
See application file for complete search history.

(56) References Cited

U.S. PATENT DOCUMENTS 5,724,575 A 3/1998 Hoover et al.
5,872,973 A 2/1999 Mitchell et al.
(Continued)

FOREIGN PATENT DOCUMENTS

AU 2014206155 12/2015
EP 0652513 5/1995
(Continued)

OTHER PUBLICATIONS

Anonymous, "BackTult—JD Edwards One World Version Control System", in 1 page, Jul. 23, 2007.
(Continued)

*Primary Examiner* — Aleksandr Kerzhner
*Assistant Examiner* — Maher N Algibhah
(74) *Attorney, Agent, or Firm* — Sheppard Mullin Richter & Hampton LLP

(57) ABSTRACT

Systems and methods are provided for determining a user request to perform a backup of a given application being provided through one or more computing systems, the user request specifying a unique identifier for the backup and an identifier corresponding to the application, determining information for performing the backup of the application based at least in part on the identifier corresponding to the application, the information specifying at least an endpoint to which data associated with the application is to be backed up, and performing a backup of the data associated with the application, wherein the data is backed up at the endpoint.

17 Claims, 6 Drawing Sheets

(52) U.S. Cl.
CPC .... *G06F 2201/80* (2013.01); *G06F 2201/805* (2013.01); *G06F 2201/82* (2013.01)

(56) References Cited

U.S. PATENT DOCUMENTS

| | | | |
|---|---|---|---|
| 5,897,636 | A | 4/1999 | Kaeser |
| 6,073,129 | A | 6/2000 | Levine et al. |
| 6,094,653 | A | 7/2000 | Li et al. |
| 6,161,098 | A | 12/2000 | Wallman |
| 6,243,717 | B1 | 6/2001 | Gordon et al. |
| 6,304,873 | B1 | 10/2001 | Klein et al. |
| 6,366,933 | B1 | 4/2002 | Ball et al. |
| 6,418,438 | B1 | 7/2002 | Campbell |
| 6,510,504 | B2 | 1/2003 | Satyanarayana |
| 6,549,752 | B2 | 4/2003 | Tsukamoto |
| 6,560,620 | B1 | 5/2003 | Ching |
| 6,574,635 | B2 | 6/2003 | Stauber et al. |
| 6,745,382 | B1 | 6/2004 | Zothner |
| 6,976,210 | B1 | 12/2005 | Silva et al. |
| 6,980,984 | B1 | 12/2005 | Huffman et al. |
| 7,058,648 | B1 | 6/2006 | Lightfoot et al. |
| 7,111,231 | B1 | 9/2006 | Huck et al. |
| 7,194,680 | B1 | 3/2007 | Roy et al. |
| 7,461,158 | B2 | 12/2008 | Rider et al. |
| 7,725,530 | B2 | 5/2010 | Sah et al. |
| 7,725,728 | B2 | 5/2010 | Ama et al. |
| 7,730,082 | B2 | 6/2010 | Sah et al. |
| 7,730,109 | B2 | 6/2010 | Rohrs et al. |
| 7,761,407 | B1 | 7/2010 | Stern |
| 7,814,084 | B2 | 10/2010 | Hallett et al. |
| 7,962,495 | B2 | 6/2011 | Jain et al. |
| 7,984,374 | B2 | 7/2011 | Caro et al. |
| 8,041,714 | B2 | 10/2011 | Aymeloglu et al. |
| 8,112,425 | B2 | 2/2012 | Baum et al. |
| 8,126,848 | B2 | 2/2012 | Wagner |
| 8,185,819 | B2 | 5/2012 | Sah et al. |
| 8,229,902 | B2 | 7/2012 | Vishniac et al. |
| 8,504,542 | B2 | 8/2013 | Chang et al. |
| 8,676,857 | B1 | 3/2014 | Adams et al. |
| 8,930,331 | B2 | 1/2015 | McGrew et al. |
| 8,954,410 | B2 | 2/2015 | Chang et al. |
| 9,009,827 | B1 | 4/2015 | Albertson et al. |
| 9,026,496 | B1* | 5/2015 | Bachu ................ G06F 11/1448 707/645 |
| 9,043,696 | B1 | 5/2015 | Meiklejohn et al. |
| 9,092,482 | B2 | 7/2015 | Harris et al. |
| 9,116,975 | B2 | 8/2015 | Shankar et al. |
| 9,208,159 | B2 | 12/2015 | Stowe et al. |
| 9,230,280 | B1 | 1/2016 | Maag et al. |
| 9,280,532 | B2 | 3/2016 | Cicerone |
| 9,384,200 | B1* | 7/2016 | Batchu ................ G06F 11/1435 |
| 9,733,929 | B1* | 8/2017 | Graf ........................ G06F 8/71 |
| 2001/0051949 | A1 | 12/2001 | Carey et al. |
| 2001/0056522 | A1 | 12/2001 | Satyanarayana |
| 2002/0091694 | A1 | 7/2002 | Hrle et al. |
| 2003/0105759 | A1 | 6/2003 | Bess et al. |
| 2003/0115481 | A1 | 6/2003 | Baird et al. |
| 2003/0120675 | A1 | 6/2003 | Stauber et al. |
| 2003/0130993 | A1 | 7/2003 | Mendelevitch et al. |
| 2003/0212718 | A1 | 11/2003 | Tester |
| 2004/0030852 | A1* | 2/2004 | Coombs .............. G06F 11/1448 711/162 |
| 2004/0111410 | A1 | 6/2004 | Burgoon et al. |
| 2004/0117345 | A1 | 6/2004 | Bamford et al. |
| 2004/0117387 | A1 | 6/2004 | Civetta et al. |
| 2004/0148301 | A1 | 7/2004 | McKay et al. |
| 2005/0097441 | A1 | 5/2005 | Herbach et al. |
| 2005/0108231 | A1 | 5/2005 | Findleton et al. |
| 2005/0114763 | A1 | 5/2005 | Nonomura et al. |
| 2005/0289524 | A1 | 12/2005 | McGinnes |
| 2006/0074881 | A1 | 4/2006 | Vembu et al. |
| 2006/0080316 | A1 | 4/2006 | Gilmore et al. |
| 2006/0095521 | A1 | 5/2006 | Patinkin |
| 2006/0106847 | A1 | 5/2006 | Eckardt et al. |
| 2006/0116991 | A1 | 6/2006 | Calderwood |
| 2006/0161558 | A1 | 7/2006 | Tamma et al. |
| 2006/0218206 | A1 | 9/2006 | Bourbonnais et al. |
| 2006/0218405 | A1 | 9/2006 | Ama et al. |
| 2006/0218491 | A1 | 9/2006 | Grossman et al. |
| 2006/0242630 | A1 | 10/2006 | Koike et al. |
| 2006/0253502 | A1 | 11/2006 | Raman et al. |
| 2006/0265397 | A1 | 11/2006 | Bryan et al. |
| 2007/0043705 | A1* | 2/2007 | Kaushik ............... G06F 11/1448 |
| 2007/0043715 | A1* | 2/2007 | Kaushik ................. G06F 16/24 |
| 2007/0050429 | A1 | 3/2007 | Goldring et al. |
| 2007/0061487 | A1 | 3/2007 | Moore et al. |
| 2007/0143253 | A1 | 6/2007 | Kostamaa et al. |
| 2007/0185850 | A1 | 8/2007 | Walters et al. |
| 2007/0233756 | A1 | 10/2007 | D'Souza et al. |
| 2007/0271317 | A1 | 11/2007 | Carmel |
| 2008/0015970 | A1 | 1/2008 | Brookfield et al. |
| 2008/0104060 | A1 | 5/2008 | Abhyankar et al. |
| 2008/0104149 | A1 | 5/2008 | Vishniac et al. |
| 2008/0133622 | A1* | 6/2008 | Brown ................ G06F 11/1458 |
| 2008/0177806 | A1* | 7/2008 | Cannon ............... G06F 11/1456 |
| 2008/0184063 | A1* | 7/2008 | Abdulvahid ........ G06F 11/1469 714/6.3 |
| 2008/0195672 | A1 | 8/2008 | Hamel et al. |
| 2008/0201339 | A1 | 8/2008 | McGrew |
| 2008/0215546 | A1 | 9/2008 | Baum et al. |
| 2008/0270316 | A1 | 10/2008 | Guidotti et al. |
| 2008/0301378 | A1 | 12/2008 | Carrie |
| 2009/0031247 | A1 | 1/2009 | Walter et al. |
| 2009/0037417 | A1 | 2/2009 | Shankar et al. |
| 2009/0106308 | A1 | 4/2009 | Killian et al. |
| 2009/0164387 | A1 | 6/2009 | Armstrong et al. |
| 2009/0172669 | A1 | 7/2009 | Bobak et al. |
| 2009/0177962 | A1 | 7/2009 | Gusmorino et al. |
| 2009/0240664 | A1 | 9/2009 | Dinker et al. |
| 2009/0254971 | A1 | 10/2009 | Herz |
| 2009/0271435 | A1 | 10/2009 | Yako et al. |
| 2009/0313223 | A1 | 12/2009 | Rantanen |
| 2009/0313311 | A1 | 12/2009 | Hoffmann et al. |
| 2010/0036831 | A1 | 2/2010 | Vemuri et al. |
| 2010/0070489 | A1 | 3/2010 | Aymeloglu et al. |
| 2010/0076939 | A1 | 3/2010 | Iwaki et al. |
| 2010/0082541 | A1 | 4/2010 | Kottomtharayil |
| 2010/0114817 | A1 | 5/2010 | Broeder et al. |
| 2010/0114831 | A1 | 5/2010 | Gilbert et al. |
| 2010/0114887 | A1 | 5/2010 | Conway et al. |
| 2010/0138842 | A1 | 6/2010 | Balko et al. |
| 2010/0145909 | A1 | 6/2010 | Ngo |
| 2010/0146231 | A1* | 6/2010 | Gopalan ............. G06F 11/1458 711/162 |
| 2010/0161554 | A1* | 6/2010 | Datuashvili ......... G06F 16/1748 707/610 |
| 2010/0161565 | A1 | 6/2010 | Lee et al. |
| 2010/0161688 | A1 | 6/2010 | Kesselman et al. |
| 2010/0191884 | A1 | 7/2010 | Holenstein et al. |
| 2010/0211550 | A1 | 8/2010 | Daniello et al. |
| 2010/0211618 | A1 | 8/2010 | Anderson et al. |
| 2010/0235606 | A1 | 9/2010 | Oreland et al. |
| 2010/0283787 | A1 | 11/2010 | Hamedi et al. |
| 2010/0306283 | A1* | 12/2010 | Johnson ............... G06F 16/125 707/803 |
| 2010/0318838 | A1 | 12/2010 | Katano et al. |
| 2010/0325581 | A1 | 12/2010 | Finkelstein et al. |
| 2011/0029498 | A1 | 2/2011 | Ferguson et al. |
| 2011/0047405 | A1* | 2/2011 | Marowsky-Bree ......... G06F 11/1415 714/15 |
| 2011/0047540 | A1 | 2/2011 | Williams et al. |
| 2011/0153592 | A1 | 6/2011 | DeMarcken |
| 2011/0161132 | A1 | 6/2011 | Goel et al. |
| 2011/0173619 | A1 | 7/2011 | Fish |
| 2011/0184813 | A1 | 7/2011 | Barne et al. |
| 2011/0258158 | A1 | 10/2011 | Resende et al. |
| 2011/0258242 | A1 | 10/2011 | Eidson et al. |
| 2011/0270812 | A1 | 11/2011 | Ruby |
| 2012/0072825 | A1 | 3/2012 | Sherkin et al. |
| 2012/0123989 | A1 | 5/2012 | Yu et al. |
| 2012/0124179 | A1 | 5/2012 | Cappio et al. |
| 2012/0136804 | A1 | 5/2012 | Lucia |
| 2012/0150791 | A1 | 6/2012 | Willson |

(56) References Cited

U.S. PATENT DOCUMENTS

| | | | |
|---|---|---|---|
| 2012/0159307 A1 | 6/2012 | Chung et al. | |
| 2012/0330908 A1 | 12/2012 | Stowe et al. | |
| 2013/0036346 A1 | 2/2013 | Cicerone | |
| 2013/0060742 A1 | 3/2013 | Chang et al. | |
| 2013/0097130 A1 | 4/2013 | Bingol et al. | |
| 2013/0151388 A1 | 6/2013 | Falkenborg et al. | |
| 2013/0212136 A1* | 8/2013 | Nishida | G06F 16/13 707/830 |
| 2013/0304770 A1 | 11/2013 | Boero et al. | |
| 2013/0318060 A1 | 11/2013 | Chang et al. | |
| 2014/0149272 A1 | 5/2014 | Hirani et al. | |
| 2014/0181833 A1 | 6/2014 | Bird et al. | |
| 2014/0244853 A1* | 8/2014 | Singh | H04W 8/24 709/230 |
| 2014/0324876 A1 | 10/2014 | Konik et al. | |
| 2014/0344231 A1 | 11/2014 | Stowe et al. | |
| 2015/0039886 A1 | 2/2015 | Kahol et al. | |
| 2015/0089353 A1 | 3/2015 | Folkening | |
| 2015/0106347 A1 | 4/2015 | McGrew et al. | |
| 2015/0112956 A1 | 4/2015 | Chang et al. | |
| 2015/0212663 A1 | 7/2015 | Papale et al. | |
| 2015/0213043 A1 | 7/2015 | Ishii et al. | |
| 2015/0213134 A1 | 7/2015 | Nie et al. | |
| 2015/0227295 A1 | 8/2015 | Meiklejohn et al. | |
| 2015/0242397 A1 | 8/2015 | Zhuang | |
| 2015/0261817 A1 | 9/2015 | Harris et al. | |
| 2015/0312335 A1* | 10/2015 | Ying | H04L 67/1061 709/201 |
| 2015/0341467 A1 | 11/2015 | Lim et al. | |
| 2016/0034545 A1 | 2/2016 | Shankar et al. | |
| 2016/0062555 A1 | 3/2016 | Ward et al. | |
| 2016/0147730 A1 | 5/2016 | Cicerone | |
| 2016/0170836 A1* | 6/2016 | Shrestha | G06F 11/1451 707/654 |
| 2016/0342403 A1* | 11/2016 | Zamir | G06F 8/61 |
| 2017/0235641 A1* | 8/2017 | Ancel | G06F 16/1774 707/654 |
| 2017/0277451 A1* | 9/2017 | Gole | G06F 11/004 |
| 2018/0143884 A1* | 5/2018 | Brunzema | G06F 11/1471 |

FOREIGN PATENT DOCUMENTS

| | | |
|---|---|---|
| EP | 2555126 | 2/2013 |
| EP | 2863326 | 4/2015 |
| EP | 2891992 | 7/2015 |
| EP | 2993595 | 3/2016 |
| WO | WO 2012/025915 | 3/2012 |

OTHER PUBLICATIONS

Antoshenkov, Gennady, "Dictionary-Based Order-Preserving String Compression", The VLDB Journal, pp. 26-39, 1997.

Apache HBase.

Baker et al., "Megastore: Providing Scalable, Highly Available Storage for Interactive Services", 5th Biennial Conference on Innovative Data Systems Research (CIDR '11), Asilomar, California, Jan. 9-12, 2011.

Bernstein et al., "Hyder—A Transactional Record Manager for Shared Flash", 5th Biennial Conference on Innovative Data Systems Research (CIDR '11), vol. 12, Asilomar, California, Jan. 9-12, 2011.

Chang et al., "Bigtable: A Distributed Storage System for Structured Data", Google, Inc., OSDI'06: Seventh Symposium on Operating System Design and Implementation, Seattle, WA, Nov. 2006.

Chung, Chin-Wan, "Dataplex: An Access to Heterogeneous Distributed Databases", Communications of the ACM, Association for Computing Machinery, Inc., vol. 33, Issue No. 1, pp. 70-80, Jan. 1, 1990.

Devanbu et al., "Authentic Third-party Data Publication", http://www.cs.ucdavis.edu/~devanbu/authdbpub.pdf, p. 19, 2000.

Dreyer et al., "An Object-Oriented Data Model for a Time Series Management System", Proceedings of the 7th International Working Conference on Scientific and Statistical Database Management, p. 12, Charlottesville, Virginia, USA, Sep. 28-30, 1994.

Elmasri et al., "Fundamentals of Database Systems", Fourth Edition, pp. 455-491, 2004.

Hogue et al., "Thresher: Automating the Unwrapping of Semantic Content from the World Wide Web", 14th International Conference on World Wide Web, WWW 2005: Chiba, Japan, May 10-14, 2005.

Klemmer et al., "Where Do Web Sites Come From? Capturing and Interacting with Design History," Association for Computing Machinery, CHI 2002, Apr. 20-25, 2002, Minneapolis, MN, pp. 8.

Kokossi et al., "D7-Dynamic Ontology Management System (Design)", Information Societies Technology Programme, pp. 1-27.

Mentzas et al., "An Architecture for Intelligent Assistance in the Forecasting Process", Proceedings of the Twenty-Eighth Hawaii International Conference on System Sciences, vol. 3, pp. 167-176, Jan. 3-6, 1995.

Miklau et al., "Securing History: Privacy and Accountability in Database Systems", 3rd Biennial Conference on Innovative Data Systems Research (CIDR), pp. 387-396, Asilomar, California, Jan. 7-10, 2007.

Niepert et al., "A Dynamic Ontology for a Dynamic Reference Work", Joint Conference on Digital Libraries, pp. 1-10, Vancouver, British Columbia, Jun. 17-22, 2007.

Nierman, "Evaluating Structural Similarity in XML Documents", 6 pages, 2002.

Notice of Allowance for U.S. Appl. No. 13/196,788 dated Dec. 18, 2015.

Notice of Allowance for U.S. Appl. No. 13/826,228 dated Mar. 27, 2015.

Notice of Allowance for U.S. Appl. No. 14/192,767 dated Dec. 16, 2014.

Notice of Allowance for U.S. Appl. No. 14/278,963 dated Sep. 2, 2015.

Notice of Allowance for U.S. Appl. No. 14/451,221 dated Aug. 4, 2015.

Notice of Allowance for U.S. Appl. No. 14/504,103 dated May 18, 2015.

Notice of Allowance for U.S. Appl. No. 14/734,772 dated Apr. 27, 2016.

Notice of Allowance for U.S. Appl. No. 14/746,671 dated Jan. 21, 2016.

Notice of Allowance for U.S. Appl. No. 14/849,454 dated May 25, 2016.

Official Communication for European Patent Application No. 14189344.6 dated Feb. 20, 2015.

Official Communication for European Patent Application No. 14199182.8 dated Mar. 13, 2015.

Official Communication for European Patent Application No. 15183721.8 dated Nov. 23, 2015.

Official Communication for Netherlands Patent Application No. 2012436 dated Nov. 6, 2015.

Official Communication for U.S. Appl. No. 13/196,788 dated Oct. 23, 2015.

Official Communication for U.S. Appl. No. 13/196,788 dated Nov. 25, 2015.

Official Communication for U.S. Appl. No. 14/278,963 dated Jan. 30, 2015.

Official Communication for U.S. Appl. No. 14/451,221 dated Apr. 6, 2015.

Official Communication for U.S. Appl. No. 14/504,103 dated Mar. 31, 2015.

Official Communication for U.S. Appl. No. 14/504,103 dated Feb. 5, 2015.

Official Communication for U.S. Appl. No. 14/578,389 dated Oct. 21, 2015.

Official Communication for U.S. Appl. No. 14/578,389 dated Apr. 22, 2016.

Official Communication for U.S. Appl. No. 14/580,218 dated Jun. 26, 2015.

Official Communication for U.S. Appl. No. 14/580,218 dated Jun. 7, 2016.

Official Communication for U.S. Appl. No. 14/726,211 dated Apr. 5, 2016.

(56) References Cited

OTHER PUBLICATIONS

Official Communication for U.S. Appl. No. 14/734,772 dated Jul. 24, 2015.
Official Communication for U.S. Appl. No. 14/734,772 dated Oct. 30, 2015.
Official Communication for U.S. Appl. No. 14/746,671 dated Nov. 12, 2015.
Official Communication for U.S. Appl. No. 14/746,671 dated Sep. 28, 2015.
Official Communication for U.S. Appl. No. 14/841,338 dated Feb. 18, 2016.
Official Communication for U.S. Appl. No. 14/961,830 dated May 20, 2016.
Official Communication for U.S. Appl. No. 14/996,179 dated May 20, 2016.
Peng et al., "Large-scale Incremental Processing Using Distributed Transactions and Notifications", Proceedings of the 9th USENIX Symposium on Operating Systems Design and Implementation, USENIX, p. 14, 2010.
Quest, "Toad for ORACLE 11.6—Guide to Using Toad", pp. 1-162, Sep. 24, 2012.
The Apache Cassandra Project.
Thomson et al., "The Case for Determinism in Database Systems", The 36th International Conference on Very Large Data Bases, Proceedings of the VLDB Endowment, vol. 3, Issue No. 1, p. 11, Singapore, Sep. 13-17, 2010.
Wikipedia, "Federated Database System," Sep. 7, 2013, retrieved from the internet on Jan. 27, 2015 http://en.wikipedia.org/w/index.php?title=Federated_database_system&oldid=571954221.
Wollrath et al., "A Distributed Object Model for the Java System", Conference on Object-Oriented Technologies and Systems, pp. 219-231, Jun. 17-21, 1996.
Yang et al., "HTML Page Analysis Based on Visual Cues", A129, pp. 859-864, 2001.

\* cited by examiner

APPROACHES FOR BACKUP AND RESTORATION OF INTEGRATED DATABASES

FIELD OF THE INVENTION

This disclosure relates to approaches for backup and restoration of data.

BACKGROUND

Under conventional approaches, backup processes can be initiated to copy various data to sites for preservation. These sites may include backup data stores or backup media. In general, a backup of data may capture a point-in-time snapshot of the data that can be used to fully restore the data at a later time. Such backups may be performed on-demand and/or at pre-defined time intervals. Further, such backups of the data may be full backups that copy the data in its entirety or incremental backups that copy portions of the data. In some instances, such conventional approaches for backing up and restoring data can be inadequate especially in distributed computing environments that include various databases and disparate data sources.

SUMMARY

Various embodiments of the present disclosure can include systems, methods, and non-transitory computer readable media configured to determine a user request to perform a backup of a given application being provided through one or more computing systems, the user request specifying a unique identifier for the backup and an identifier corresponding to the application; determine information for performing the backup of the application based at least in part on the identifier corresponding to the application, the information specifying at least an endpoint to which data associated with the application is to be backed up; and perform a backup of the data associated with the application, wherein the data is backed up at the endpoint.

In some embodiments, the systems, methods, and non-transitory computer readable media are configured to cause a directory tree to be created in at least one data store to which the backup of the data is to be stored, the data store being associated with the endpoint.

In some embodiments, the systems, methods, and non-transitory computer readable media are configured to determine a user request to perform a restoration of the application, the user request specifying the unique identifier for the backup and the identifier corresponding to the application; obtain data corresponding to the backup of the data associated with the application from the endpoint; and perform a restoration of the backup of the data associated with the application.

In some embodiments, the systems, methods, and non-transitory computer readable media are configured to generate one or more hashes using at least a portion of the data associated with the application, wherein the hashes are generated from one or more key-value pairs in a key-value store associated with the application.

In some embodiments, the portion of the data for which the hashes are generated is sampled pseudo-randomly and/or deterministically.

In some embodiments, the systems, methods, and non-transitory computer readable media are configured to generate one or more hashes using at least a portion of the data associated with the application, wherein the hashes are generated from data that is sampled pseudo-randomly from one or more database tables.

In some embodiments, the systems, methods, and non-transitory computer readable media are configured to determine at least one database that is associated with the application; generate a backup of at least one index corresponding to the database; and after backup of the index is complete, generating a backup of the database.

In some embodiments, the systems, methods, and non-transitory computer readable media are configured to generate an incremental re-index for the database, wherein the incremental re-index is able to be replayed to update the index to reference data that was added to the database after backup of the index.

In some embodiments, the systems, methods, and non-transitory computer readable media are configured to determine at least one database that is associated with the application; determine at least one key-value store that is associated with the application; generate a backup of the database; and after backup of the database is complete, generating a backup of the key-value store.

In some embodiments, the systems, methods, and non-transitory computer readable media are configured to determine that the data associated with the application is stored among a cluster of nodes; determine topology information that describes an arrangement of the cluster of nodes; generate a backup of the data associated with the application from the cluster of nodes; and store the topology information with the backup of the data, wherein the topology information is able to be used to restore the data to any cluster of nodes that matches the arrangement of the cluster of nodes.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Under conventional approaches, backup processes can be initiated to copy various data to sites for preservation. These sites may include backup data stores or backup media. In general, a backup of data may capture a point-in-time snapshot of the data that can be used to fully restore the data at a later time. Such backups may be performed on-demand and/or at pre-defined time intervals. Further, such backups of the data may be full backups that copy the data in its entirety or incremental backups that copy portions of the data. In some instances, such conventional approaches for backing up and restoring data can be inadequate especially in distributed computing environments that include various databases and disparate data sources.

A claimed solution rooted in computer technology overcomes problems specifically arising in the realm of computer technology. In various embodiments, a data protection system can be configured to backup data associated with one or more applications (or services) that rely on various databases and disparate data sources. For example, a user can initiate a backup of data associated with a given application through a transfer service. The transfer service can be configured to copy the data associated with the application to an endpoint (e.g., cloud storage). In some embodiments, the transfer service copies the data based on a specified backup order. The transfer service can create a local backup of the data on a data store that is accessible to the transfer service. This backup can then be encrypted and uploaded to the endpoint. When a restoration of the data is initiated by the user, the transfer service can obtain the data from the endpoint and subsequently decrypt the data. The transfer service can then verify the integrity of the data, for example, by performing checksum operations on the data. If verification is successful, the transfer service can restore the data to the computing system(s) from which the data was originally backed up. In some embodiments, the transfer service performs the data restoration based on a specified restoration order.

Figure 1:
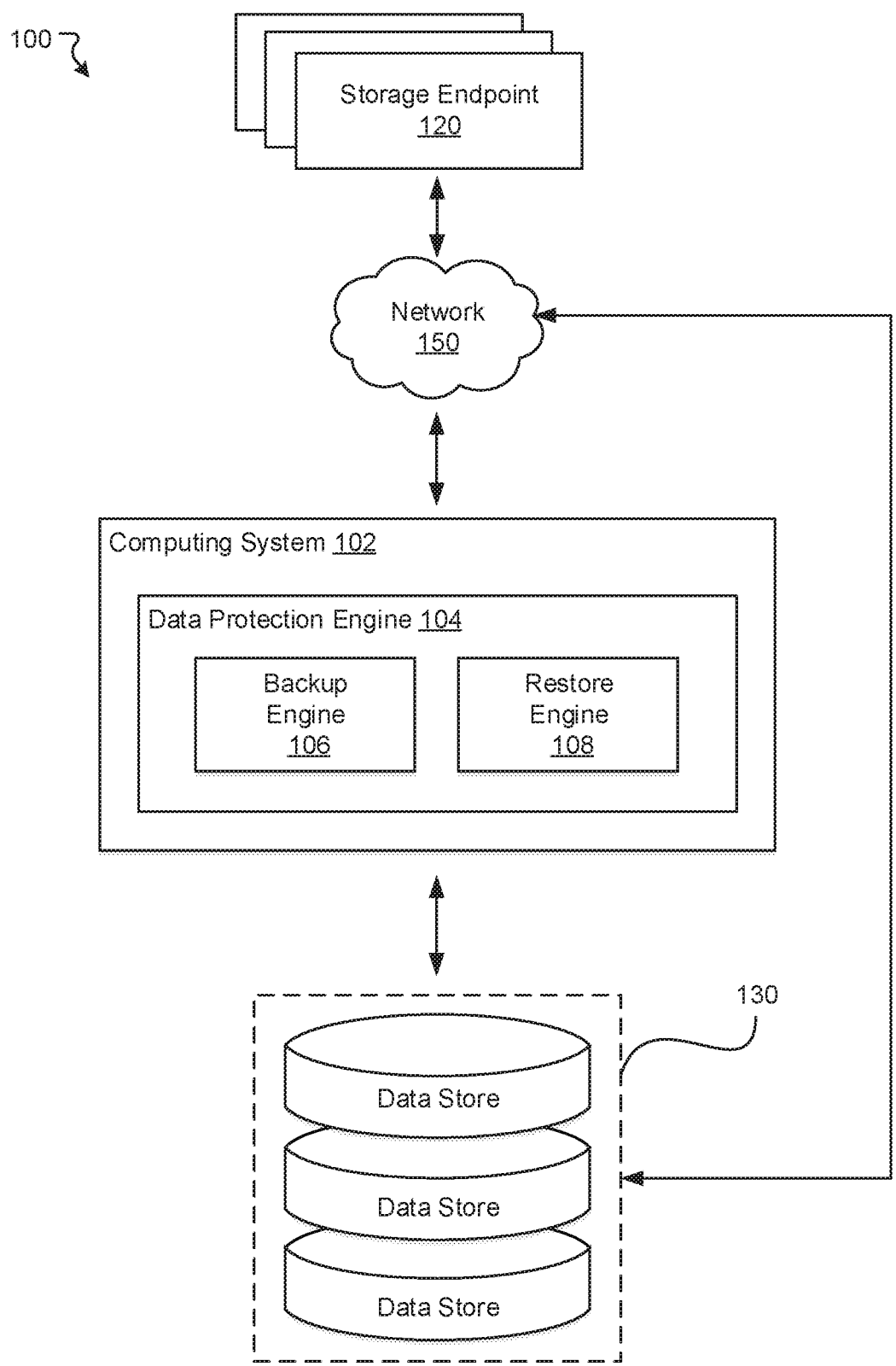
FIG. 1 illustrates an example environment for performing backup and restoration of data, in accordance with various embodiments.

FIG. 1 illustrates an example environment 100 for performing backup and restoration of data, in accordance with various embodiments. The example environment 100 can include at least one computing system 102 that includes one or more processors and memory. The processors can be configured to perform various operations by interpreting machine-readable instructions.

In some embodiments, the computing system 102 can include a data protection engine 104 which can include a backup engine 106 and a restore engine 108. The data protection engine 104 can be executed by the processor(s) of the computing system 102 to perform various operations including those described in reference to the backup engine 106 and the restore engine 108. In general, the data protection engine 104 can be implemented, in whole or in part, as software that is capable of running on one or more computing devices or systems. In one example, the data protection engine 104 may be implemented as or within a software application running on one or more computing devices (e.g., user or client devices) and/or one or more servers (e.g., network servers or cloud servers). In some instances, various aspects of the data protection engine 104, the backup engine 106, and/or the restore engine 108 may be implemented in one or more computing systems and/or devices. The environment 100 may also include one or more data stores 130 that are accessible to the computing system 102. In general, a data store may be any device in which data can be stored and from which data can be retrieved. The data stores 130 may be accessible to the computing system 102 either directly or over a network 150. The network 150 may be any wired or wireless network through which data can be sent and received (e.g., the Internet).

In various embodiments, the backup engine 106 can be configured to initiate, or perform, backups of various data stored in the data stores 130. In general, a backup refers to the copying of data (e.g., files, databases, indexes, key-value stores, object graphs, etc.) from a primary source (e.g., the data stores 130) to a secondary source (e.g., a storage endpoint 120). In some embodiments, when backup of data from the data sources 130 is initiated, the backup engine 106 copies the data from the data sources 130 and stores it at a specified storage endpoint (e.g., the storage endpoint 120). In some instances, the storage endpoint may be accessible over one or more networks (e.g., the network 150). Further, the storage endpoint 120 may refer to one or more devices through which data can be stored and retrieved. For example, the storage endpoint 120 may be one or more computing systems to which data can be sent for storage and retrieval (e.g., a cloud-based storage system, network storage device, etc.). More details describing the backup engine 106 will be provided below in reference to FIG. 2.

In various embodiments, the restore engine 108 can be configured to obtain, or download, backups of various data stored at the storage endpoint 120 for purposes of restoring the data. In general, restoring a backup refers to the copying of data from a secondary source (e.g., the storage endpoint 120) to a primary source (e.g., the data stores 130) from which the data was originally backed up. In some embodiments, when a restore is initiated, the restore engine 108 obtains the data from the storage endpoint 120 and restores it in appropriate locations (e.g., drives, directories, folders, etc.) in the data sources 130. In some instances, the retrieval of data from the storage endpoint 120 may be performed over one or more networks (e.g., the network 150). More details describing the restore engine 108 will be provided below in reference to FIG. 3.

Figure 2:
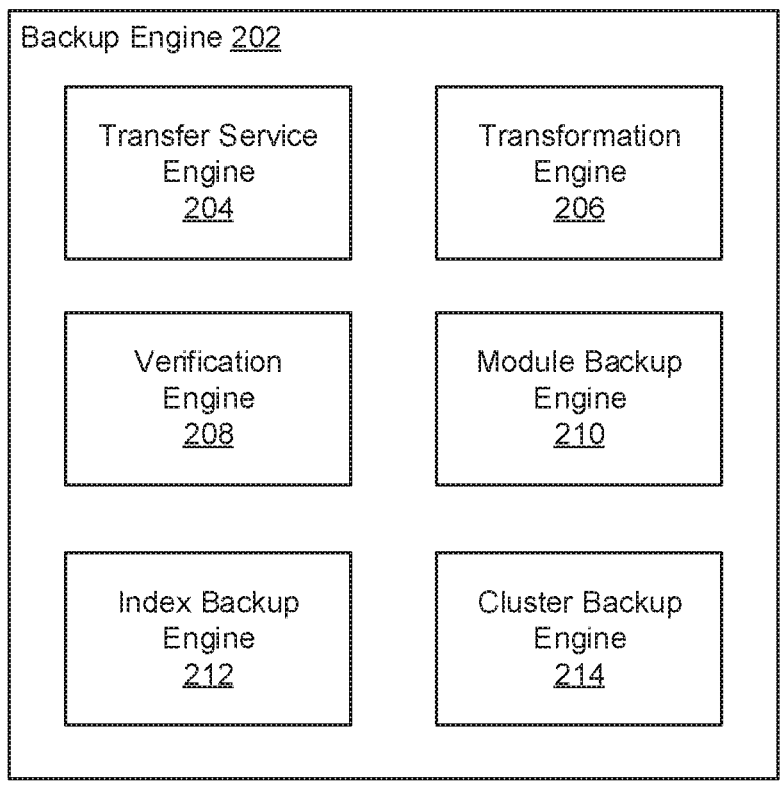
FIG. 2 illustrates an example backup engine, in accordance with various embodiments.

FIG. 2 illustrates an example backup engine 202, in accordance with various embodiments. The backup engine 202 may be implemented as the backup engine 106 of FIG. 1. In some embodiments, the backup engine 202 includes a transfer service engine 204, a transformation engine 206, a verification engine 208, a module backup engine 210, an index backup engine 212, and a cluster backup engine 214.

In various embodiments, the transfer service engine 204 can be configured to create backups of various data. For example, the transfer service engine 204 can be configured to copy files from one or more directories in one or more data stores to one or more specified storage endpoints. In another example, the transfer service engine 204 can be configured to create backups of one or more applications (or services) that rely on various databases and/or disparate data sources. In various embodiments, a user can initiate a backup of data that is accessible to a computing device through a software application running on the computing device. In such embodiments, the backup engine 202 can be implemented in the software application. In some embodiments, when initiating the backup, the user can provide the transfer service engine 204 with information that can be used to manage the backup. For example, in some embodiments, the user provides the transfer service engine 204 with a unique identifier (ID) referencing the backup job being initiated and an identifier that references the application (or service) being backed up. In some embodiments, for each file being backed up (e.g., files that are part of the application and/or service being backed up), the transfer service engine 204 keeps track of the identifier that references the application (or service) being backed up, the identifier referencing the backup in which the file was included, and the identifier of the volume (or data store) from which the file was backed up. In some embodiments, when creating a backup of an application (or service) the transfer service engine 204 can be configured to perform any operations necessary for disabling, or shutting down, the application (or service) so that an accurate and consistent backup can be created. In some embodiments, the transfer service engine 204 creates online backups of an application (or service) without disabling or shutting down the application (or service).

In various embodiments, the transfer service engine 204 can use the information provided by the user to determine how to create a backup of the data. For example, the transfer service engine 204 can use the identifier that references the application (or service) being backed up to determine information for performing the backup. This information may be obtained from one or more configuration files, for example. In some embodiments, the transfer service engine 204 uses the application (or service) identifier to identify one or more directories in one or more data stores in which the application (or service) is installed (or stored). Based on this information, the transfer service engine 204 can also use the application (or service) identifier to determine one or more directories that needed to be copied to create a backup of the application (or service) being backed up. Further, the transfer service engine 204 can also use the application (or service) identifier to determine one or more storage endpoints to which the backup will be sent for storage. In some embodiments, the transfer service engine 204 copies the data based on a specified backup order. As an example, a backup order for a given application (or service) may indicate that a database should be backed up first, followed by a different database, followed by a key-value store, followed by data stored in a cluster of nodes. In some instances, backing up data (e.g., data sources) in a particular backup order can be necessary to guarantee the backup's integrity, especially in distributed computing systems. For example, backing up data in a particular order may be needed to achieve consistency guarantees for data that is reliant on, or linked to, data in a separate system.

When a backup is initiated, the transfer service engine 204 can be configured to copy the data being backed up (e.g., data associated with an application or service) to one or more specified storage endpoints. In some embodiments, when performing the backup, the transfer service engine 204 creates a local backup of the data on a data store that is accessible to the transfer service engine 204. For example, the transfer service engine 204 can initially create a backup of the data being backed up in a data store that is locally accessible to the computing device on which the transfer service engine 204 is executing. The transfer service engine 204 can also create (or request) a directory tree in the storage endpoint that matches the local directory tree of the data being backed up. In some embodiments, the respective names of one or more directories in the directory tree created at the storage endpoint include both the backup job identifier and the application (or service) identifier corresponding to the backup being performed. After the local backup is complete (e.g., files have been copied to the local directory tree), the transfer service 204 can then copy the files in the local backup to the specified storage endpoint(s). These files are copied to the appropriate directories in the directory tree created at the storage endpoint.

In some embodiments, copying backup data to a storage endpoint is performed through a centralized backup system. For example, when performing a backup, the transfer service engine 204 can create a local backup of the data on a data store that is accessible to the transfer service engine 204. In such embodiments, the transfer service engine 204 can copy the local backup of the data to the centralized backup system using various data transfer tools or protocols (e.g., rsync). In one example, the local backup can be copied to a distributed file system (e.g., Network File System) that is accessible to the centralized backup system. In this example, the centralized backup system can perform operations to transfer the backup data to appropriate storage endpoints.

In some embodiments, the transformation engine 206 is configured to apply one or more data transformations to the local backup prior to copying the local backup to the storage endpoint(s). For example, in some embodiments, the transformation engine 206 compresses files in the local backup using generally known data compression techniques. In some embodiments, files in the local backup are encrypted prior to being copied to the storage endpoint(s). Such encryption may be performed using generally known encryption techniques including, for example, public-key cryptography techniques.

In some embodiments, when copying files to the storage endpoint(s), the verification engine 208 is configured to generate respective checksums (e.g., MD5 sums) for some, or all, of the files being copied to the storage endpoint(s). In some embodiments, these checksums serve various uses such as verifying data, determining which files have been added to the local directory tree of the data being backed up, determining which files have been deleted from the local directory tree, and/or determining which files in the local directory tree have been modified. As a result, the verification engine 208 can be used to facilitate incremental backups in addition to full snapshots.

In some embodiments, the verification engine 208 can be configured to generate respective hashes for some, or all, of the data being backed up. These hashes can be used to verify (or validate) data after being restored. In some embodiments, the verification engine 208 generates hashes for a pseudo-random and/or deterministic sample of the data. In some embodiments, data sampled pseudo-randomly exhibits statistical randomness while being generated by a deterministic causal process. For example, the verification engine 208 can pseudo-randomly and/or deterministically sample a set of files included in a given backup. In this example, a respective hash can be generated for each sampled file. In various embodiments, these hashes may be generated using generally known techniques. In some embodiments, the verification engine 208 pseudo-randomly and/or deterministically samples data from data sources (e.g., databases, key-value stores, object graphs, etc.) being backed up. For example, the verification engine 20 can pseudo-randomly and/or deterministically sample data from a key-value store being backed up and can generate respective hashes for the sampled data (e.g., key-value pairs). In some embodiments, the data is pseudo-randomly and/or deterministically sampled from one or more tables (e.g., tables corresponding to the key-value store, database tables, etc.). In some embodiments, the verification engine 208 samples data from a given table by selecting data from a byte encoded address space corresponding to the table. For example, the verification engine 208 can use the byte encoded address space to sample rows from the table. The verification engine 208 can then generate respective hashes for each of the sampled rows. This approach can be used to pseudo-randomly and/or deterministically sample data from a data source (e.g., key-value store, database, etc.) without having to perform a full table scan. Once generated, these hashes can be used to verify the accuracy of data being restored. In some embodiments, the verification engine 208 generates respective hashes for all of the data stored in a given data source. For example, the verification engine 208 can perform a full table scan for a given table and can generate respective hashes for each row in the table. These hashes can be used to validate the rows after being restored. In some embodiments, the verification engine 208 generates respective hashes for certain fields in the rows (e.g., fields corresponding to a given column) of a given table.

In some instances, the data being backed up may be accessible through one or more databases. To enable backup of such data, in some embodiments, the module backup engine 210 implements one or more modules that are configured to access and extract data from various types of databases for purposes of copying the data to a storage endpoint. In some embodiments, the module backup engine 210 also utilizes these modules to obtain data from the storage endpoint and to restore the data back (e.g., restore data back into the backed up application and/or service). These modules can be vendor- or database-specific. For example, the module backup engine 210 can implement the Automated Storage Management (ASM) module that is configured to create backups of an Oracle™ database. In general, modules can be implemented to create backups of data stored in any given database (e.g., relational databases), object graph, and/or key-value store (KVS). In some embodiments, when backing up a database (e.g., a relational database) and corresponding key-value store, the module backup engine 210 is configured to create a backup of the database first followed by a backup of the key-value store. In some embodiments, the index backup engine 212 can be configured to create backups of database indexes. For example, conventional approaches typically store database indexes together with the databases to which those indexes correspond. Under these conventional approaches, a backup of such databases generally results in the database indexes also being included in the backup. However, in some implementations, database indexes may be stored separately from the databases themselves. For example, a database index for a given database may be stored in a separate service (or data store) that is external to the database. To ensure that such databases and indexes are backed up accurately, in some embodiments, the index backup engine 212 creates a backup of any indexes corresponding to a database before creating a backup of the database itself. In such embodiments, when data from the database is being restored, an incremental re-index (or replay) can be performed to catch up the indexes to any new data that was added to the database. Alternatively, in some embodiments, indexes are rebuilt from the database using a full re-index rather than relying on an incremental re-index.

In some instances, the backup engine 202 may need to create backups of data stored in a cluster of nodes having a given topology. In such instances, a successful restoration of the data typically requires that the data be restored to a cluster of nodes that have a matching topology. For example, data backed up from a cluster of 5 nodes may need to be restored to a cluster that also includes 5 nodes. Thus, in some embodiments, the cluster backup engine 214 can be configured to manage topology information (e.g., arrangement of datacenters, racks, nodes, etc.) associated with backups. This information can be used to ensure that data is restored to the correct nodes which are clustered according to the given topology. For example, in some embodiments, the cluster backup engine 214 can map the nodes of the backed-up stack to the nodes of the restored-into stack so that nodes that were in the same rack in the backed-up stack are in the same rack in the restored-into stack, and that racks that are in the same datacenter in the backed-up stack are in the same datacenter in the restored-into stack.

Although the examples provided herein describe the transfer service engine 204 as being invoked by a user to initiate backups of data, in general, the transfer service engine 204 may be invoked in other ways. For example, in some embodiments, the transfer service engine 204 may be invoked automatically at scheduled times or intervals. In another example, the transfer service engine 204 may be invoked by, or through, the applications (or services) for which backups are being created.

Figure 3:
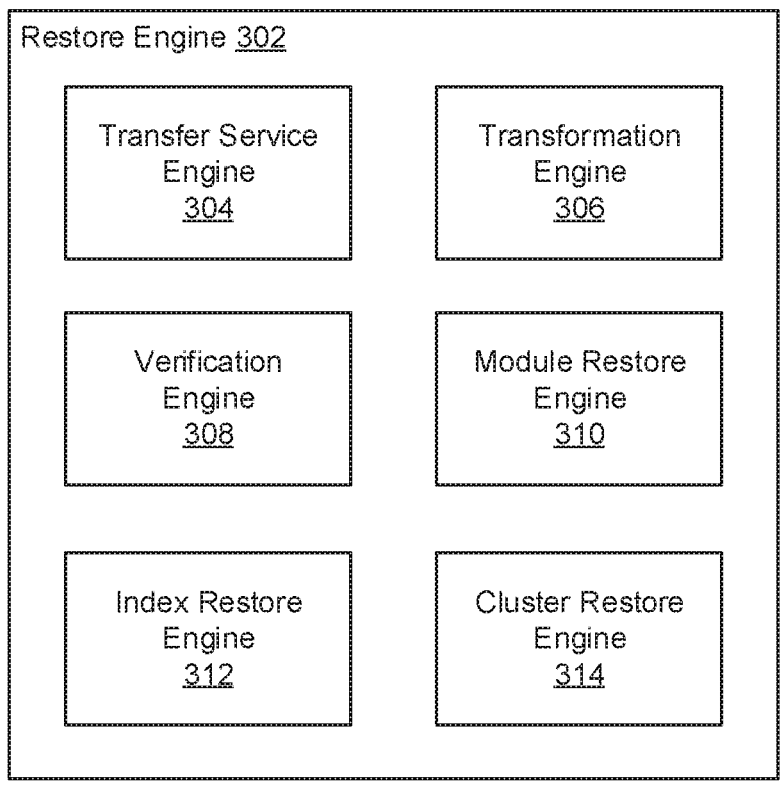
FIG. 3 illustrates an example restore engine, in accordance with various embodiments.

FIG. 3 illustrates an example restore engine 302, in accordance with various embodiments. The restore engine 302 may be implemented as the restore engine 108 of FIG. 1. In some embodiments, the restore engine 302 includes a transfer service engine 304, a transformation engine 306, a verification engine 308, a module restore engine 310, an index restore engine 312, and a cluster restore engine 314.

In various embodiments, the transfer service engine 304 can be configured to restore data from previous backups of the data. For example, the transfer service engine 304 can be configured to copy files from one or more storage endpoints to one or more corresponding directories in one or more local data stores. In another example, the transfer service engine 304 can be configured to restore data from backups of one or more applications (or services) that rely on various databases and/or disparate data sources. When copying data from a storage endpoint to directories in local data stores, the transfer service engine 304 can copy the files back to their original locations in the local data stores using the same file names, directory structures, and contents as determined when initially backing up the data.

In various embodiments, a user can initiate a restoration of data to a computing device through a software application running on the computing device. In such embodiments, the restore engine 302 can be implemented in the software application. In some embodiments, when initiating the restore, the user can provide the transfer service engine 304 with information that can be used to facilitate the restoration. For example, in some embodiments, the user provides the transfer service engine 304 with a unique identifier (ID) that references the backup that is being restored and an identifier that references the application (or service) being restored. In various embodiments, the transfer service engine 304 can use the information provided by the user to determine how to restore a backup. For example, the transfer service engine 304 can identify the backup that is referenced by the unique identifier provided by the user. The transfer service engine 304 can then copy data corresponding to the backup from one or more storage endpoints at which the backup was stored to a local data store. In some embodiments, the transfer service engine 304 can use the identifier that references the application (or service) being restored to determine information for performing the restore. This information may be obtained from one or more configuration files, for example. In some embodiments, the transfer service engine 304 uses the application (or service) identifier to identify one or more directories in one or more data stores from which the application (or service) was originally backed up. The transfer service engine 304 can use this information to restore the application (or service) to appropriate locations in a local data store. The transfer service engine 304 can also use the application (or service) identifier to determine one or more storage endpoints from which the backup will be retrieved. In some embodiments, the transfer service engine 304 restores the data based on a specified restore order. In various embodiments, when restoring data corresponding to an application (or service), the transfer service engine 304 can be configured to perform any operations necessary for disabling, or shutting down, the application (or service) so that an accurate and consistent restoration of the data can be performed.

In some embodiments, the transformation engine 306 is configured to apply one or more data transformations to data that was restored from a storage endpoint. For example, in some embodiments, the transformation engine 306 de-compresses files in the restored backup using generally known data compression techniques. In some embodiments, files in the restored backup are de-encrypted after being copied from the storage endpoint(s). Such encryption may be performed using generally known encryption techniques including, for example, public-key cryptography techniques.

In some embodiments, when restoring data, the verification engine 308 is configured to validate the data being restored. For example, in some embodiments, the verification engine 308 can verify hashes (e.g., pseudo-randomly sampled hashes, full scan hashes, etc.) that were generated for the data being restored. These hashes may have been stored with a backup of the data at a storage endpoint, for example. To verify a given portion of data (e.g., file, row, table, object, etc.), the verification engine 308 can generate a hash for the restored data. This hash can then be compared against a hash that was generated for the data when the data was initially being backed up. If the hashes match, then accuracy of the data being restored is confirmed. Otherwise, the data can be flagged and/or one or more notifications indicating the hash mismatch can be provided to users.

As mentioned, in some instances, the data being restored may have been backed up through one or more databases. To enable restoration of such data, in some embodiments, the module restore engine 310 implements one or more modules that are configured to restore data to various types of databases. In general, these modules can be implemented to restore data stored in any given database (e.g., relational databases), object graph, and/or key-value store (KVS).

In some embodiments, the index restore engine 312 can be configured to restore database indexes. For example, when data from the database is being restored, an incremental re-index (or replay) can be performed to catch up the database indexes to any new data that was stored in the database. In some embodiments, rather than applying an incremental re-indexing, the indexes are rebuilt from the database in their entirety using a full re-index.

In some instances, the restore engine 302 may need to restore data that was backed up from a cluster of nodes having a given topology. In such instances, a successful restoration of the data typically requires that the data be restored to a cluster of nodes that have a matching topology. Thus, in some embodiments, the cluster restore engine 314 can be configured to restore the data based on topology information (e.g., arrangement of datacenters, racks, nodes, etc.) associated with a backup of the data. This information can be used to ensure that data is restored to the correct nodes which are clustered according to the given topology.

Figure 4:
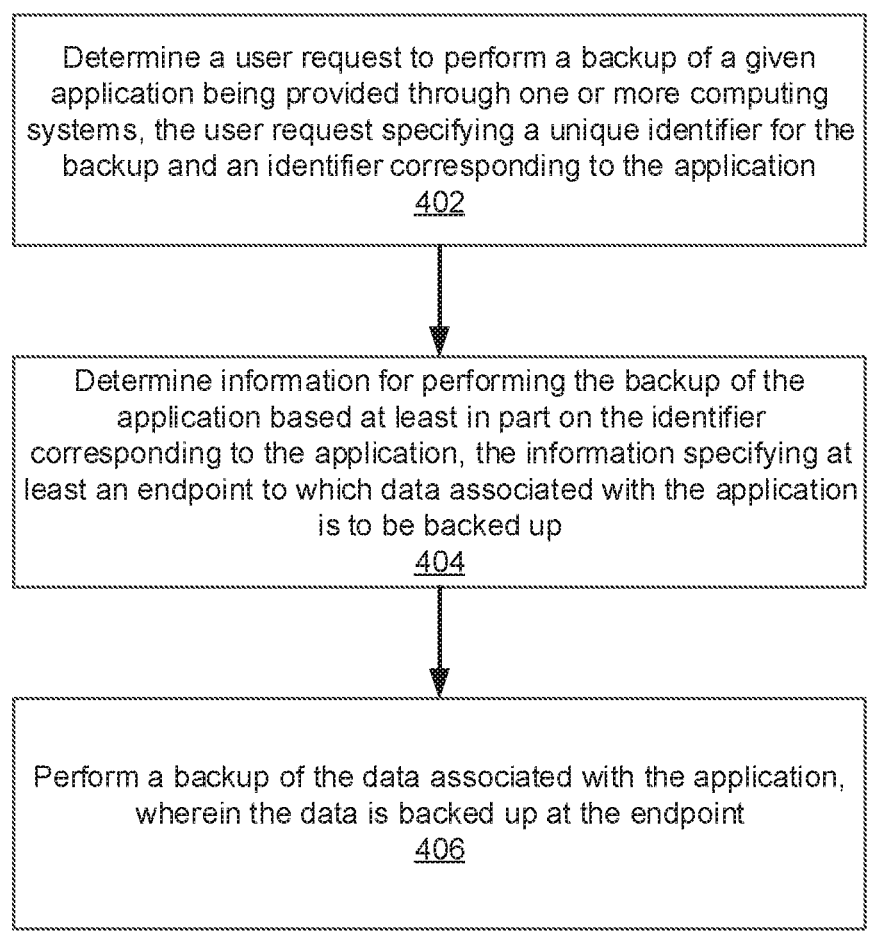
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, a determination is made of a user request to perform a backup of a given application that is being provided through one or more computing systems. The user request can specify a unique identifier for the backup and an identifier corresponding to the application. At block 404, information for performing the backup of the application is determined based at least in part on the identifier corresponding to the application. The information can specify at least an endpoint to which data associated with the application is to be backed up. At block 406, a backup of the data associated with the application is performed. As the backup progresses, the data being backed up is copied to the endpoint for storage.

Figure 5:
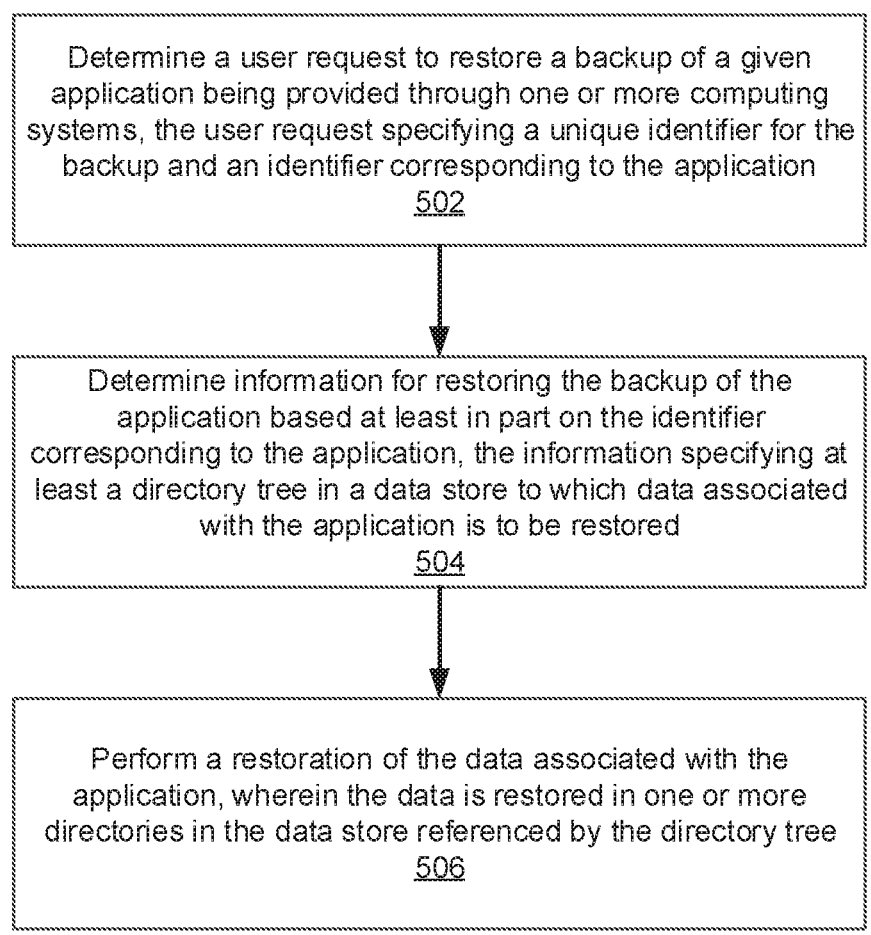
FIG. 5 illustrates a flowchart of another example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, a determination is made of a user request to perform a restore a backup of a given application that is being provided through one or more computing systems. The user request can specify a unique identifier for the backup and an identifier corresponding to the application. At block 504, information for restoring the backup of the application is determined based at least in part on the identifier corresponding to the application. The information can specify at least a directory tree in a data store to which data associated with the application is to be restored. At block 506, a restoration of the data associated with the application is performed. As the restore progresses, the data being restored is copied to one or more directories in the data store referenced by the directory tree.

HARDWARE IMPLEMENTATION

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
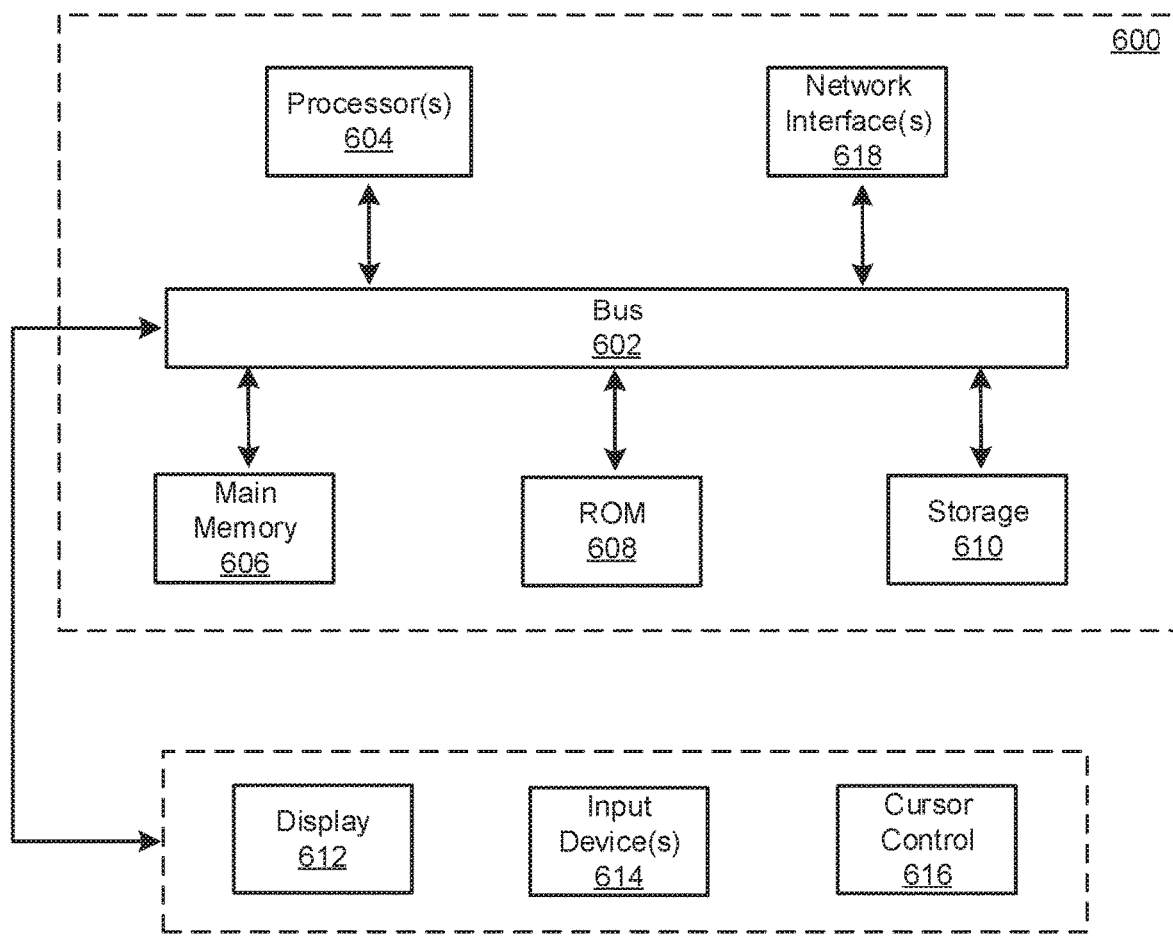
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a stand-alone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the system to perform:
   determining a user request to perform a backup of data associated with an application, the application being provided through one or more computing systems, the user request specifying a unique identifier for the backup and an identifier corresponding to the application;
   determining information for performing the backup of the data associated with the application based at least in part on the identifier corresponding to the application, the information specifying at least an endpoint to which the data associated with the application is to be backed up and a backup order associated with the application, wherein the backup order is indicative of an order in which the data associated with the application is to be backed up;
   performing the backup of the data associated with the application, wherein the data is backed up at the endpoint in the backup order, and wherein performing the backup comprises:
      determining that the data associated with the application is stored among a first cluster of nodes corresponding to a backed-up stack of the data associated with the application;
      determining topology information that describes an arrangement of the first cluster of nodes;
      generating a backup of the data associated with the application from the first cluster of nodes; and
      storing the topology information with the backup of the data, wherein the topology information is able to be used to restore the data to any cluster of nodes that matches the arrangement of the first cluster of nodes,
   wherein generating the backup of the data associated with the application comprises:
      determining a database associated with the application;
      generating a backup of at least one index corresponding to the database, wherein the at least one index is stored in a separate data store that is external to the database; and
      after backup of the at least one index is complete, generating a backup of the database,
   wherein the instructions, when executed by the one or more processors, further cause the system to perform:
      performing a restoration of the backup of the data associated with the application, wherein performing the restoration comprises utilizing the topology information to map the first cluster of nodes corresponding to the backed-up stack to a second cluster of nodes of a restored-into stack, and wherein performing the restoration comprises performing a restoration of the database; and during restoration of the database, determining that data was added to the database after completion of the backup of the at least one index and performing an incremental re-index to update the at least one index to reference the data added to the database after completion of the backup of the at least one index.

2. The system of claim 1, wherein the instructions further cause the system to perform:

causing a directory tree to be created in at least one data store to which the backup of the data is to be stored, the data store being associated with the endpoint.

3. The system of claim 1, wherein the instructions further cause the system to perform:

determining a user request to perform a restoration of the application, the user request specifying the unique identifier for the backup and the identifier corresponding to the application; and obtaining data corresponding to the backup of the data associated with the application from the endpoint in order to perform the restoration of the backup of the data associated with the application.

4. The system of claim 1, wherein the instructions further cause the system to perform:

generating one or more hashes using at least a portion of the data associated with the application, wherein the hashes are generated from one or more key-value pairs in a key-value store associated with the application.

5. The system of claim 4, wherein the portion of the data for which the hashes are generated is sampled pseudo-randomly and deterministically.

6. The system of claim 1, wherein the instructions further cause the system to perform:

generating one or more hashes using at least a portion of the data associated with the application, wherein the hashes are generated from data that is sampled pseudo-randomly from one or more database tables.

7. The system of claim 1, wherein performing the backup of the data associated with the application further causes the system to perform:

determining at least one key-value store that is associated with the application; and after backup of the database is complete, generating a backup of the key-value store.

8. The system of claim 1, wherein the instructions further cause the system to perform:

determining a user request to restore the backup of the data associated with the application, the user request to restore the backup specifying the unique identifier for the backup and the identifier corresponding to the application; and determining information for restoring the backup based at least in part on the identifier corresponding to the application, the information for restoring the backup specifying at least a directory tree in a data store to which the data associated with the application is to be restored, wherein the data is restored in one or more directories in the data store referenced by the directory tree.

9. The system of claim 1, wherein utilizing the topology information to map the first cluster of nodes corresponding to the backed-up stack to a second cluster of nodes of the restored-into stack comprises mapping one or more nodes of the first cluster of nodes that were in a same rack in the backed-up stack to a corresponding one or more nodes of the second cluster of nodes that are in a same rack in the restored-into stack.

10. The system of claim 9, wherein utilizing the topology information to map the first cluster of nodes corresponding to the backed-up stack to a second cluster of nodes of the restored-into stack further comprises mapping one or more racks that are in a same datacenter in the backed-up stack to a corresponding one or more racks in a same datacenter in the restored-into stack.

11. A computer-implemented method, the method comprising:

determining a user request to perform a backup of data associated with an application, the application being provided through one or more computing systems, the user request specifying a unique identifier for the backup and an identifier corresponding to the application;

determining information for performing the backup of the data associated with the application based at least in part on the identifier corresponding to the application, the information specifying at least an endpoint to which the data associated with the application is to be backed up and a backup order associated with the application, wherein the backup order is indicative of an order in which the data associated with the application is to be backed up;

performing the backup of the data associated with the application, wherein the data is backed up at the endpoint in the backup order, and wherein performing the backup comprises:

determining that the data associated with the application is stored among a first cluster of nodes corresponding to a backed-up stack of the data associated with the application;

determining topology information that describes an arrangement of the first cluster of nodes;

generating a backup of the data associated with the application from the first cluster of nodes; and storing the topology information with the backup of the data, wherein the topology information is able to be used to restore the data to any cluster of nodes that matches the arrangement of the first cluster of nodes, wherein generating the backup of the data associated with the application comprises:

determining a database associated with the application;

generating a backup of at least one index corresponding to the database, wherein the at least one index is stored in a separate data store that is external to the database; and after backup of the at least one index is complete, generating a backup of the database, wherein the instructions, when executed by the one or more processors, further cause the system to perform:

performing a restoration of the backup of the data associated with the application, wherein performing the restoration comprises utilizing the topology information to map the first cluster of nodes corresponding to the backed-up stack to a second cluster of nodes of a restored-into stack, and wherein performing the restoration comprises performing a restoration of the database; and during restoration of the database, determining that data was added to the database after completion of the backup of the at least one index and performing an incremental re-index to update the at least one index to reference the data added to the database after completion of the backup of the at least one index.

12. The computer-implemented method of claim 11, the method further comprising:
    causing a directory tree to be created in at least one data store to which the backup of the data is to be stored, the data store being associated with the endpoint.

13. The computer-implemented method of claim 11, the method further comprising:
    determining a user request to perform a restoration of the application, the user request specifying the unique identifier for the backup and the identifier corresponding to the application; and
    obtaining data corresponding to the backup of the data associated with the application from the endpoint in order to perform the restoration of the backup of the data associated with the application.

14. The computer-implemented method of claim 11, the method further comprising:
    generating one or more hashes using at least a portion of the data associated with the application, wherein the hashes are generated from one or more key-value pairs in a key-value store associated with the application.

15. The computer-implemented method of claim 14, wherein the portion of the data for which the hashes are generated is sampled pseudo-randomly and deterministically.

16. The computer-implemented method of claim 11, the method further comprising:
    generating one or more hashes using at least a portion of the data associated with the application, wherein the hashes are generated from data that is sampled pseudo-randomly from one or more database tables.

17. The computer-implemented method of claim 11, wherein
    performing the backup of the data associated with the application further comprises:
        determining at least one key-value store that is associated with the application; and
        after backup of the database is complete, generating a backup of the key-value store.

* * * * *